US011461454B2

(12) United States Patent
Stein et al.

(10) Patent No.: US 11,461,454 B2
(45) Date of Patent: Oct. 4, 2022

(54) PASSIVE SENSOR READER AUTHENTICATION PROTOCOL

(71) Applicant: Analog Devices, Inc., Wilmington, MA (US)

(72) Inventors: Yosef Stein, Sharon, MA (US); Deniz Karakoyunlu, Cambridge, MA (US); Matthew J. Coles, Medway, MA (US)

(73) Assignee: Analog Devices, Inc., Wilmington, MA (US)

( * ) Notice: Subject to any disclaimer, the term of this patent is extended or adjusted under 35 U.S.C. 154(b) by 631 days.

(21) Appl. No.: 15/944,732

(22) Filed: Apr. 3, 2018

(65) Prior Publication Data

US 2018/0288016 A1 Oct. 4, 2018

Related U.S. Application Data

(60) Provisional application No. 62/481,611, filed on Apr. 4, 2017.

(51) Int. Cl.
*G06F 21/44* (2013.01)
*H04L 29/06* (2006.01)
(Continued)

(52) U.S. Cl.
CPC .............. *G06F 21/44* (2013.01); *G06F 21/82* (2013.01); *G06K 19/0723* (2013.01); *H02J 50/20* (2016.02); *H04L 9/0825* (2013.01); *H04L 9/0869* (2013.01); *H04L 9/3271* (2013.01); *H04L 63/0442* (2013.01); *H04L 63/0853* (2013.01); *H04W 12/02* (2013.01); *H04W 12/03* (2021.01); *H04W 12/06* (2013.01)

(58) Field of Classification Search
CPC ......... H04L 63/08; G06F 21/62; G06F 21/30; G06F 21/44
See application file for complete search history.

(56) References Cited

U.S. PATENT DOCUMENTS

| 5,629,981 A | 5/1997 | Nerlikar |
|---|---|---|
| 7,715,887 B2 | 5/2010 | Cloutier et al. |

(Continued)

OTHER PUBLICATIONS

SEN, Security in Wireless Sensor Networks. Book Chapter in the book "Wireless Sensor Networks: Current Status and Future Trends",. A.S.K. Pathan et al. (eds.), CRC Press USA. Nov. 2012; 51 pages.

*Primary Examiner* — Izunna Okeke
(74) *Attorney, Agent, or Firm* — Wolf, Greenfield & Sacks, P.C.

(57) ABSTRACT

According to various aspects, systems and methods are provided for secure communication between a passive sensor node and a reader. A passive sensor node may be used for monitoring in a variety of situations. A reader may power the passive sensor while communicating with the passive sensor. In some scenarios, it may be necessary or desirable to provide security between the passive sensor and the reader. According to one aspect, the reader may send a first message initiating communication with the passive sensor, which may respond with a second message including encrypted data. An authorized reader may decrypt the data and respond with data encrypted based on the second message in a third message, which may be used by the device to authenticate the reader.

20 Claims, 9 Drawing Sheets

(51) Int. Cl.
*H04L 9/40* (2022.01)
*H04L 9/32* (2006.01)
*H04L 9/08* (2006.01)
*G06K 19/07* (2006.01)
*H02J 50/20* (2016.01)
*H04W 12/02* (2009.01)
*G06F 21/82* (2013.01)
*H04W 12/06* (2021.01)
*H04W 12/03* (2021.01)

(56) References Cited

U.S. PATENT DOCUMENTS

| | | |
|---|---|---|
| 8,552,838 B2 | 10/2013 | Addy |
| 9,355,545 B2 | 5/2016 | Nekoogar et al. |
| 9,499,173 B2 | 11/2016 | Waeller |
| 9,514,339 B2 | 12/2016 | Brandsma et al. |
| 9,613,237 B2 | 4/2017 | Nikunen et al. |
| 2011/0291803 A1* | 12/2011 | Bajic .................. G08B 13/2462 340/10.1 |
| 2016/0110571 A1* | 4/2016 | Jung .................. G06Q 20/3278 340/10.1 |
| 2017/0085539 A1 | 3/2017 | Wishard |

* cited by examiner

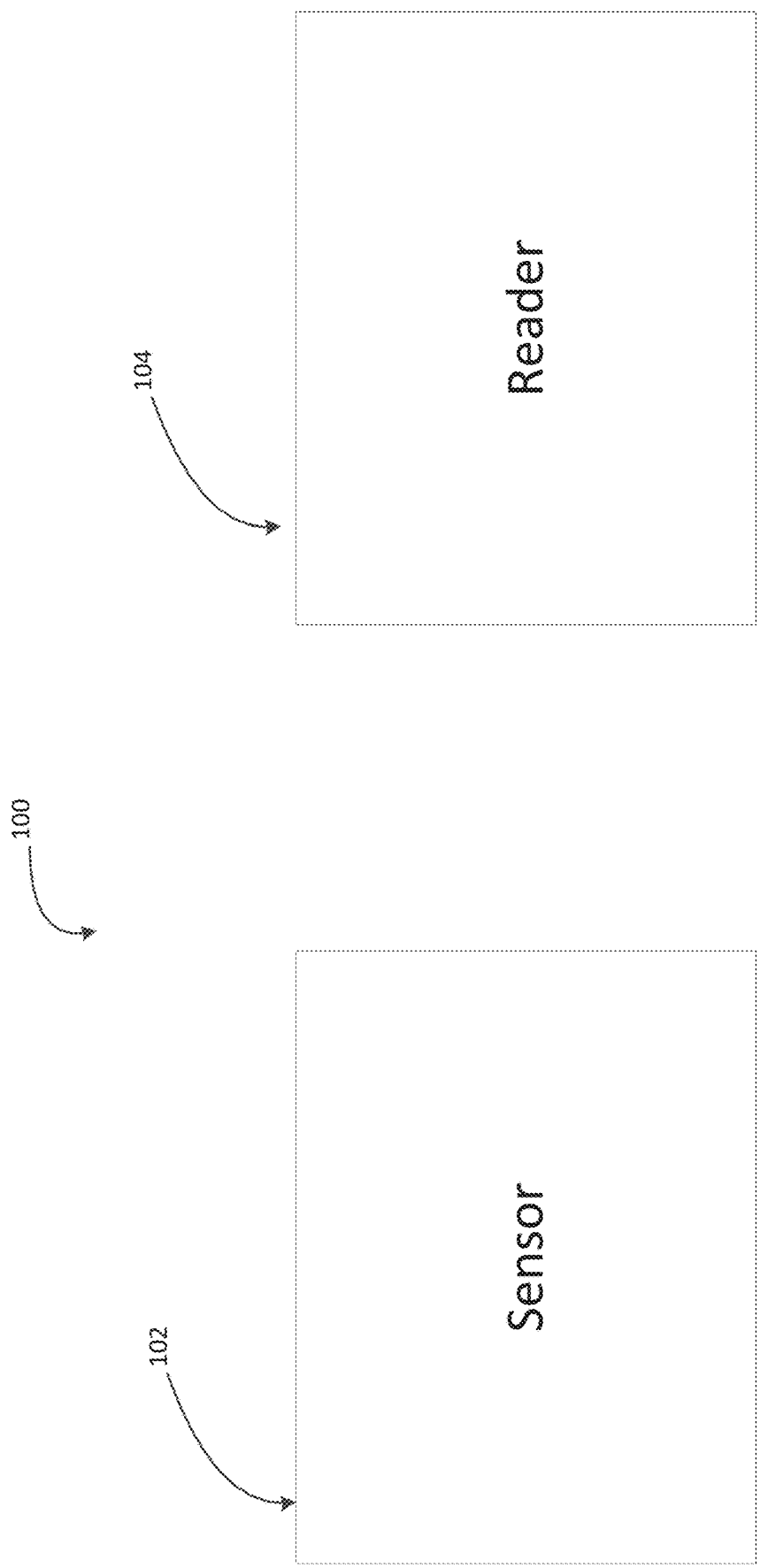

PASSIVE SENSOR READER AUTHENTICATION PROTOCOL

CROSS-REFERENCE TO RELATED APPLICATIONS

The present application claims the benefit under 35 U.S.C. 119(e) of U.S. Provisional Pat. App. Ser. No. 62/481,611, filed Apr. 4, 2017 under and entitled "PASSIVE SENSOR READER AUTHENTICATION PROTOCOL," which is hereby incorporated herein by reference in its entirety.

FIELD OF THE DISCLOSURE

The present disclosure relates to passive sensors and systems implementing such sensors.

BACKGROUND

Passive sensors are sensors which are powered by an external source, which can take various forms. Passive sensors can be used to sense a variety of conditions, including temperature, pressure, or motion.

SUMMARY OF THE DISCLOSURE

According to various aspects, systems and methods are provided for secure communication between a passive sensor node and a reader. A passive sensor node may be used for monitoring in a variety of situations. A reader may power the passive sensor while communicating with the passive sensor. In some scenarios, it may be necessary or desirable to provide security between the passive sensor and the reader. According to one aspect, the reader may send a first message initiating communication with the passive sensor, which may respond with a second message including encrypted data. An authorized reader may decrypt the data and respond with data encrypted based on the second message in a third message, which may be used by the device to authenticate the reader.

According to one aspect of the present application, a secure passive sensor node is provided. The secure passive sensor node includes a wireless communication circuit configured to transmit a first message including a nonce and first encrypted data to a reader device; and receive, responsive to transmitting the first message, a second message including second encrypted data based on the first message; and security circuitry configured to authenticate the reader device based on the second encrypted data.

According to one aspect of the present application, a reader for reading information from a passive device is provided. The reader includes a wireless communication circuit configured to communicate with an external passive device; a processor coupled to the wireless communication circuit and configured to: receive, using the wireless communication circuit, a first message including a nonce and first encrypted data from the external passive device; decrypt the first encrypted data to obtain decrypted data; and generate, responsive to the first message, a second message including second encrypted data based on the first message.

According to one aspect of the present application, a method for secure communication using a first device is provided. The method includes using the first device to perform the acts of: sending, to a second device, a first message, the first message comprising a nonce and an asymmetric encryption of a key; receiving, from the second device and responsive to the first message, a second message comprising first encrypted data; computing an encryption of the nonce using the key to obtain second encrypted data; and comparing, the first encrypted data and the second encrypted data to determine whether the first encrypted data matches the second encrypted data.

BRIEF DESCRIPTION OF THE DRAWINGS

FIG. 1 shows an embodiment of a system including a secure passive sensor and a reader.

DETAILED DESCRIPTION

Figure 2A:
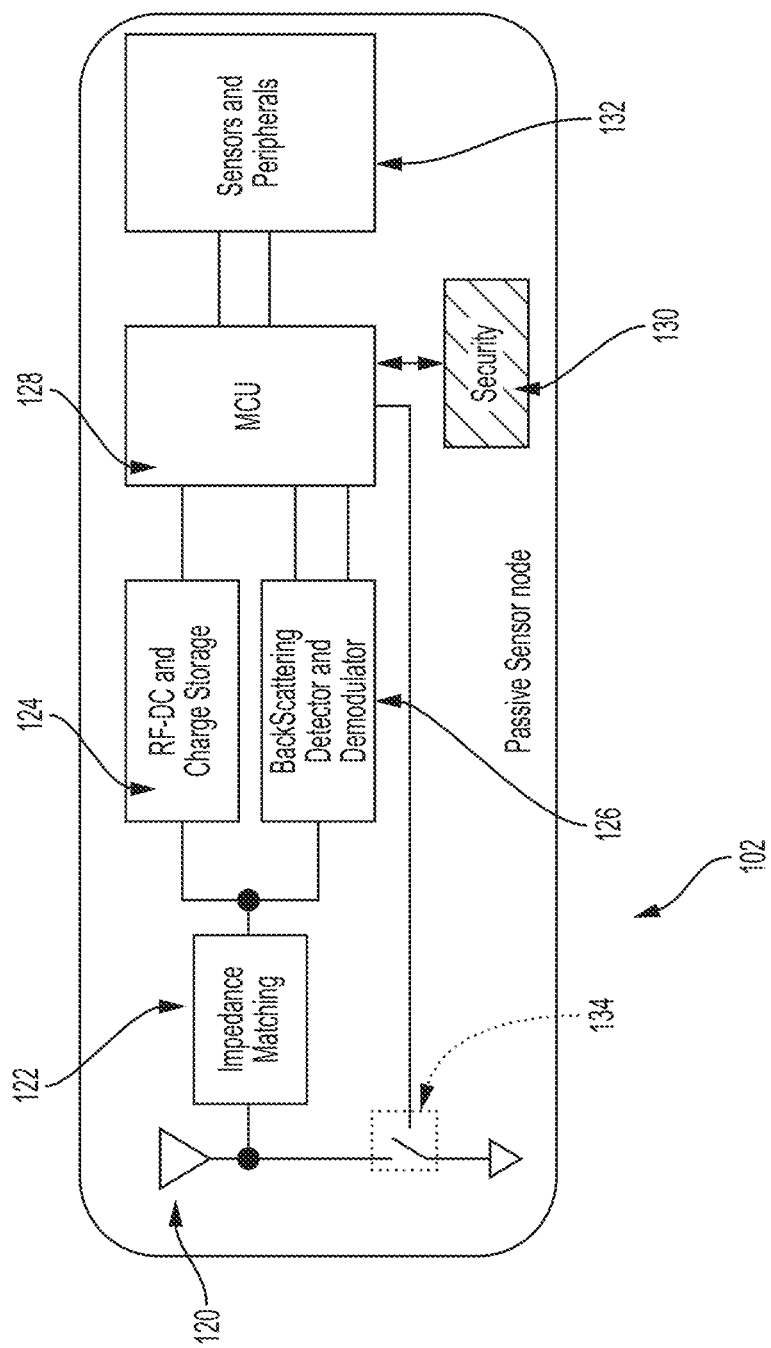
FIG. 2A shows an embodiment of a system including a secure passive sensor.

Aspects of the present application relate to secure passive sensors. The passive sensors may be powered and/or activated by a reader device. The passive sensor may include security functionality allowing the sensor to authenticate the reader and thus communicate with authenticated readers. The security functionality may include asymmetric and/or symmetric encryption schemes. The security functionality may be configured to use less power than traditional security functionality, for example by only computing symmetric encryptions on the passive sensors.

Passive sensors are used in many fields, such as monitoring for manufacturing and industrial control. Since passive sensors do not require a power source, they may be used to sense and collect data over long time periods with minimal supervision. The data may be offloaded (or extracted) using wired or wireless connections, such as sending data over the internet. However, offloading data from passive sensors requires the application of an external power source.

Additionally, security of sensor data is an increasing concern in many fields. Particularly for passive sensors, which are reliant on an external power source, traditional designs and data acquisition methods can be particularly vulnerable to tampering and typically do not verify the reader or device acquiring the data from the passive sensor. Accordingly, aspects of the present application provide a passive sensor and corresponding reader capable of verifying the identity of the reader in a low-power manner.

FIG. 1 shows an embodiment of a system 100 including a secure passive sensor 102 and a reader 104. While the system described herein is referred to as a "secure passive sensor", it should be appreciated that the "secure passive sensor" may be referred to as a "sensor node", that may include a sensor as well as security and/or communication circuitry. The secure passive sensor 102 and the reader 104 may be configured to pass messages in order to secure further communication.

FIG. 1 shows a system 100 with a secure passive sensor 102 and a reader 104. The secure passive sensor 102 may be a passive radio frequency (RF) sensor, thus lacking an onboard power source, but nonetheless may contain security functionality. For example, the secure passive sensor 102 may include radio frequency identification (RFID) technology. The secure passive sensor 102 may be powered by electromagnetic energy received from the reader 104. In some embodiments, the sensor 102 includes energy storage circuitry for storing the received energy. The sensor node may be implemented according to the systems and methods described with reference to FIG. 2A.

The secure passive sensor 102 may include any suitable sensors configured to collect data. In some embodiments, the sensors include position sensors (e.g., a global positioning system receiver among other position sensors), environmental sensors (e.g., temperature sensors among other environmental sensors), medical sensors (e.g., electrocardiogram, pulse oximetry, among other sensors), and/or any other suitable sensors. In some embodiments, the secure passive sensor 102 may be connected to suitable transducers. In some embodiments, the secure passive sensor 102 may need to be authenticated for data collected by the secure passive sensor 102 to be shared. In some embodiments, the secure passive sensor 102 may be connected to actuators that require the reader 104 to be authenticated to be activated. In some embodiments, the secure passive sensor 102 may be reprogrammed once the reader 104 is authenticated. The secure passive sensor 102 may be used for any suitable sensing and/or monitoring application. For example, the sensor may be attached to a piece of industrial equipment, such as to a manufacturing machine. The sensor 102 may also be employed where it is impracticable to provide consistent power to a sensor device.

It should be appreciated that the systems and methods described herein are not limited to sensors and may be applied to other devices. In some embodiments, it may be desirable for passive devices that omit sensors to authenticate a reader 104. For example, passive identification tags may be used to authenticate an item coupled to the tag and/or provide a serial number only to an authorized reader, such as a purchaser or authorized retailer. It should also be appreciated that the systems and methods described herein are not limited to passive devices. For example, low power devices and/or devices that cannot practically implement asymmetric encryption may benefit from the techniques described herein and be used for applications other than physical sensing. In some embodiments, the reader 104 is authenticated, for example, to establish a secure communication channel.

The reader 104 may be any suitable device for communicating with the secure passive sensor 102. The reader 104 may be portable, or brought into the proximity of the secure passive sensor 102 through any appropriate means. The reader 104 may be configured to communicate with the secure passive sensor 102 through RFID. The reader may be implemented as is described with reference to FIG. 2B.

FIG. 2A shows an embodiment of a system including a secure passive sensor 102. In the example of FIG. 2, the secure passive sensor 102 includes at least one antenna 120, an impedance matching circuit 122, an RF-DC and charge storage module 124, a backscattering detector and demodulator 126, a processor 128, a security module 130, a sensing block 132, and a switch 134. The secure passive sensor 102 may be operable to perform encryption and transmit messages for securing communication with a reader.

The processor 128 may be any suitable processor, including a field programmable gate array (FPGA), an application specific integrated circuit (ASIC), and/or a microprocessor. The processor 128 may control the operation of the sensing block 132 to perform sensing operations, such as sensing motion, temperature, pressure, humidity, corrosion, or other characteristics of interest. The processor may also control wireless communication circuitry for transmitting and receiving signals. For example, the processor 128 may control wireless communication circuitry including the impedance matching circuit 122, the RF-DC and charge storage module 124, and the backscattering detector and demodulator 126. In some embodiments, the wireless communication circuitry may operate according to conventional communication protocols. The processor 128 may also selectively enable wireless communication using the switch 134. The impedance matching circuit 122 may be used for impedance matching of the at least one antenna 120. The RF-DC and charge storage module 124 and the backscattering detector and demodulator 126 may be used by the processor 128 to communicate through the at least one antenna 120 with the reader 104.

The secure passive sensor 102 may not contain an active power source (e.g., a battery storing charge in excess of what is received from a reader), and may rely on the reader 104 to power the communication. Electromagnetic energy may be received through the at least one antenna 120 and stored using the RF-DC and charge storage module 124.

The security module 130 may work in connection with the processor 128 to secure the communication between the secure passive sensor 102 and the reader 104. In some embodiments, the security module 130 is implemented by and/or included within the processor 128. The security module may be implemented using any suitable circuitry, such as asymmetric and/or symmetric encryption engines. The security module may be operable to limit communication between the secure passive sensor 102 to authenticated readers in some embodiments. The secure passive sensor 102 may be prevented, by the security module 130, from communicating with readers that fail to be authenticated.

In some embodiments, the secure passive sensor 102, using the security module 130, the processor 128, and/or the wireless communication circuitry, may transmit a first message including a nonce and first encrypted data to a reader (e.g., 104). The nonce includes any suitable data that may be used to distinguish a current message from a previously sent message. The nonce, therefore, may prevent an adversary from recording and replaying a message in order to gain information and/or access improperly. For example, the nonce may be a random number, a number that is unique to each message, incremented for each message, decremented for each message, or computed in any suitable manner. In some embodiments, the nonce includes all or a portion of the unique data in a message that is used in only one message. Thus, the nonce may include one or more integers or any suitable data.

The encrypted data may include an encryption key, for example for performing symmetric encryption. The secure passive sensor 102 may, responsive to the first message, receive a second message including data that was encrypted (e.g., by a reader) based on the first message. For example, the second message may include data, such as the nonce, encrypted using a symmetric encryption key sent in the first message. The passive sensor 102 may compute the same encryption as was performed at the reader and authenticate the reader if the locally computed encryption matches the received encryption.

Figure 2B:
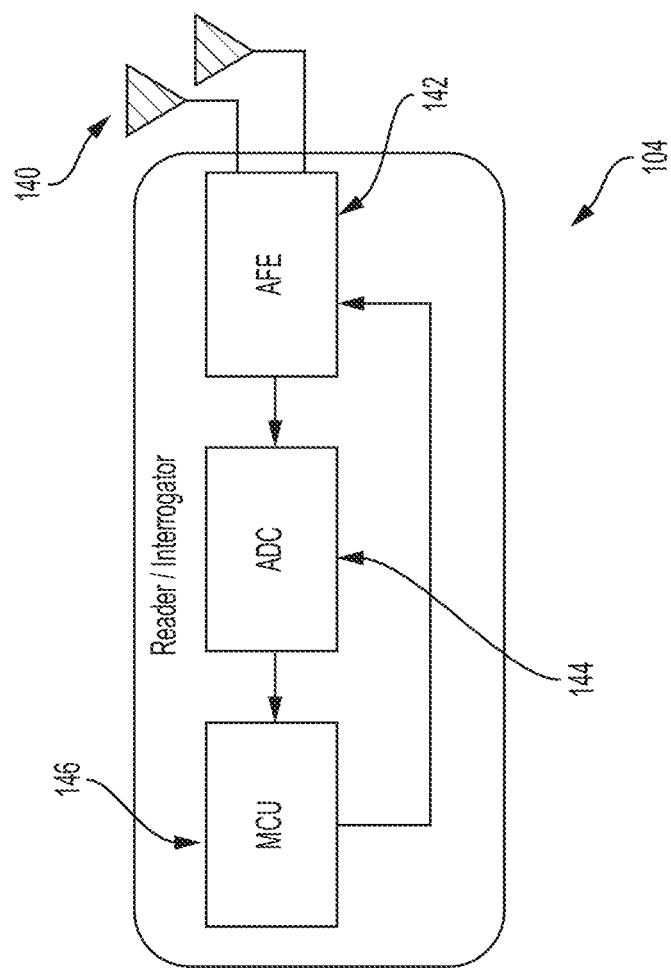
FIG. 2B shows an embodiment of a system including a reader.

FIG. 2B shows an embodiment of a system including a reader 104. In the example of FIG. 2B, the reader 104 includes at least one antenna 140, an analog front end (AFE) 142, an analog to digital converter (ADC) 144, and a processor 146. The reader 104 may be operable to communicate securely with a passive sensor node (e.g., 102).

The at least one antenna 140 may be configured to communicate wirelessly with a passive sensor node. The at least one antennae may implement any suitable physical layer communication protocol. In some embodiments, the at least one antenna 140 may be used for beamforming or for omni-directional transmission.

The AFE 142 may comprise any suitable analog front end electronics, such as RFID communication hardware, to drive communication through the at least one antenna 140 and receive communication from the at least one antenna 140. The AFE 142 may provide suitable transmission power for powering one or more passive sensor nodes. The AFE 142 may provide signals received through the at least one antenna 140 to the ADC 144, which may convert the received signals to a digital signal suitable for use by the processor 146.

The processor 146 may be any suitable processor including a field programmable gate array (FPGA), an application specific integrated circuit (ASIC), and/or a microprocessor. The processor 146 may analyze the signal received from the ADC 144 and perform any suitable control and/or communication operations. For example, the processor may receive a message from a passive sensor node that includes a nonce and an asymmetrically encrypted key. The processor 146 may retrieve a private asymmetric encryption key from memory to decrypt the message to obtain a second key, which may be a symmetric encryption key. The processor may then generate and transmit, using the AFE 142, a message including the nonce and encrypted using the second key.

Figure 3:
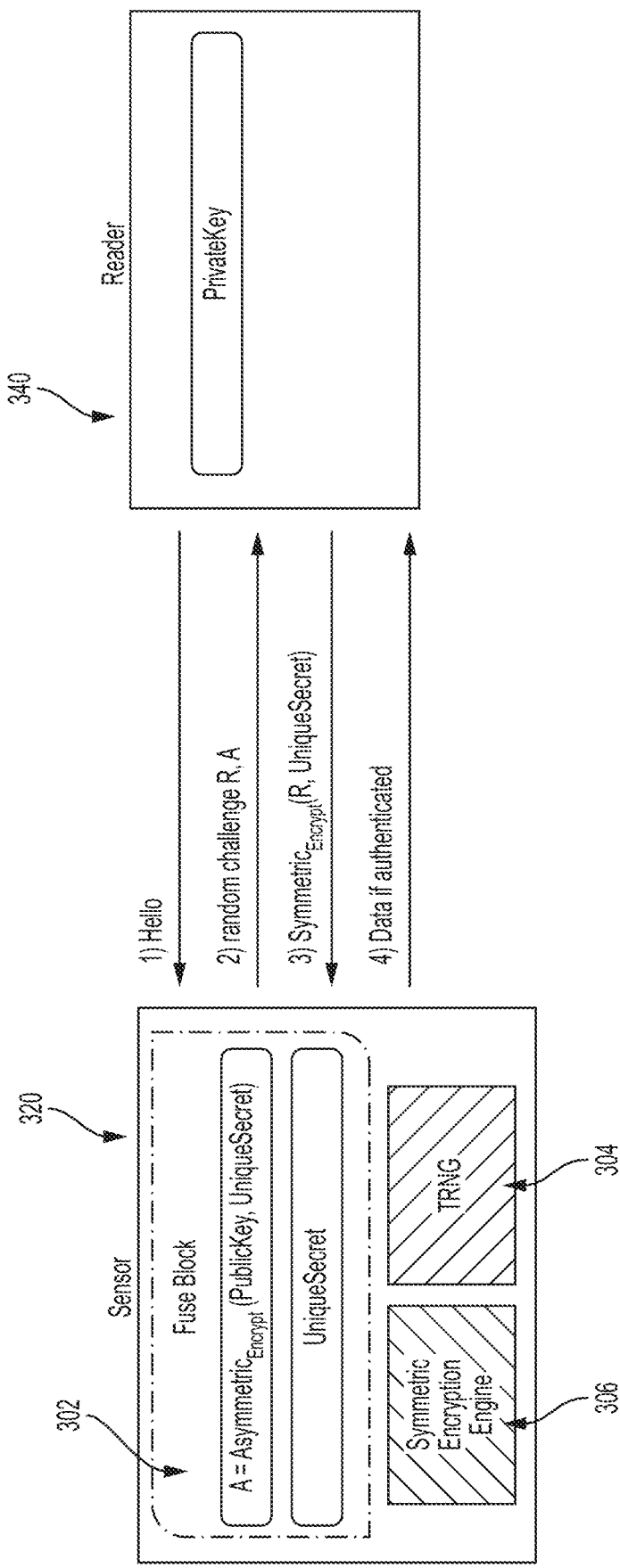
FIG. 3 shows an embodiment of a reader authentication protocol which may be implemented in a system having a secure passive sensor, according to a non-limiting embodiment of the present application.

FIG. 3 shows an embodiment of a reader authentication protocol which may be implemented in a system having a secure passive sensor 320, according to a non-limiting embodiment of the present application. FIG. 3 illustrates the secure passive sensor 320 communicating with a reader 340. The secure passive sensor 320 includes a fuse block 302, a symmetric encryption engine 306, and a true random number generator (TRNG) 304. The secure passive sensor 320 may be implemented as was described with reference to FIGS. 1 and 2A. The reader may be implemented as was described with reference to FIGS. 1 and 2B. For example, the fuse block 302 may correspond to one or more components within the security module 130 of FIG. 2A, or within the processor 128. The symmetric encryption engine 306 and TRNG 304 may correspond to elements within security module 130 or the processor 128 of FIG. 2A. The true random number generator 304 may be any suitable hardware random number generator which generates approximately unpredictable results. In some embodiments, the random challenge R is not randomly computed and the TRNG 304 may be omitted.

The fuse block 302 may be a set of physical fuses holding fixed predetermined values. The symmetric encryption engine 306 may be any suitable system for implementing symmetric encryption. The fuse block 302 may contain a first value, Unique Secret, and a second value, Public Key. The Public Key may be available to any device within the system. The fuse block 302 may also contain a third value, A, the result of asymmetrically encrypting the Unique Secret with the Public Key. The unique secret may be an encryption key. The unique secret may be unique to the device and kept secret to prevent devices from impersonating a valid reader.

The reader 340 may contain a first value, Private Key, which may correspond to the Public Key in the secure passive sensor 320. The Private Key may correspond to a value within the processor 146 of FIG. 2, or to a physical component within the reader 104. The Public Key and Private Key may be any suitable keys, for example in any suitable asymmetric encryption protocol.

One embodiment of the secure communication protocol is now described, although alternatives are possible. In step 1, the reader 340 may send a first message to the secure passive sensor 320. The first message may be any suitable 'wake up' message, to establish communication between the reader 340 and the secure passive sensor 320. For example, as shown, the first message may be "Hello."

In step 2, the secure passive sensor 320 may send a second message to the reader 340. The second message may comprise a random challenge R and the third value, A. The random challenge R, a nonce, may be any number produced by the TRNG 304 or any other suitable nonce. Upon receiving the second message, the reader 340 may asymmetrically decrypt A, using the Private Key, to recover the Unique Secret.

Once the reader 340 has recovered the Unique Secret, it may symmetrically encrypt the random challenge R, using the Unique Secret, and send the result to the secure passive sensor 320 as the third message. The secure passive sensor 320 may also symmetrically encrypt the random challenge R, using the Unique Secret. Once the third message is received, the secure passive sensor 320 may confirm that its result from symmetrically encrypting the random challenge R, using the Unique Secret matches the third message. Once the secure passive sensor 320 obtains a value from the reader 340 that matches the result of its symmetric encryption of the random challenge R, using the Unique Secret, it may authenticate the reader 340. For example, once the reader 340 is authenticated, the secure passive sensor 320 may optionally send an additional message (e.g., including sensor data) to the reader 340. Thus, it should be appreciated that the communication protocol shown in FIG. 3 may protect the secure passive sensor from unauthenticated readers, thus providing a level of security to the sensor data sensed and collected by the secure passive sensor.

While the protocol described above utilizes the values determined as the messages between the secure passive sensor 320 and the reader 340, it should be understood that the messages may comprise additional information, such as a preamble, error check, or synchronizing information. Additionally, the values may be modified before transmission. Asymmetric encryption here is taken to mean an algorithm that uses a public key for encryption and a private key for decryption. For example, RSA, ECC, ElGamal, or Lattice-based cryptosystems may be suitable. Symmetric encryption here is taken to mean an algorithm that uses the same keys for both encryption and decryption. For example, AES, Blowfish, CAST5, DES/TDES, IDEA, RC2, RC4, RC6, Serpent, and Twofish may be suitable.

In some embodiments, the nonce sent in the second message may be a symmetric encryption of a second nonce using the Unique Secret as the key. The reader 340 may then use the unique secret to decrypt the nonce and obtain the second nonce. The passive sensor 320 and the reader 340 may then compute an encryption of the Unique Secret using the second nonce as the key. As described above, if the encrypted values match, the reader 340 may be authenticated.

Figure 4:
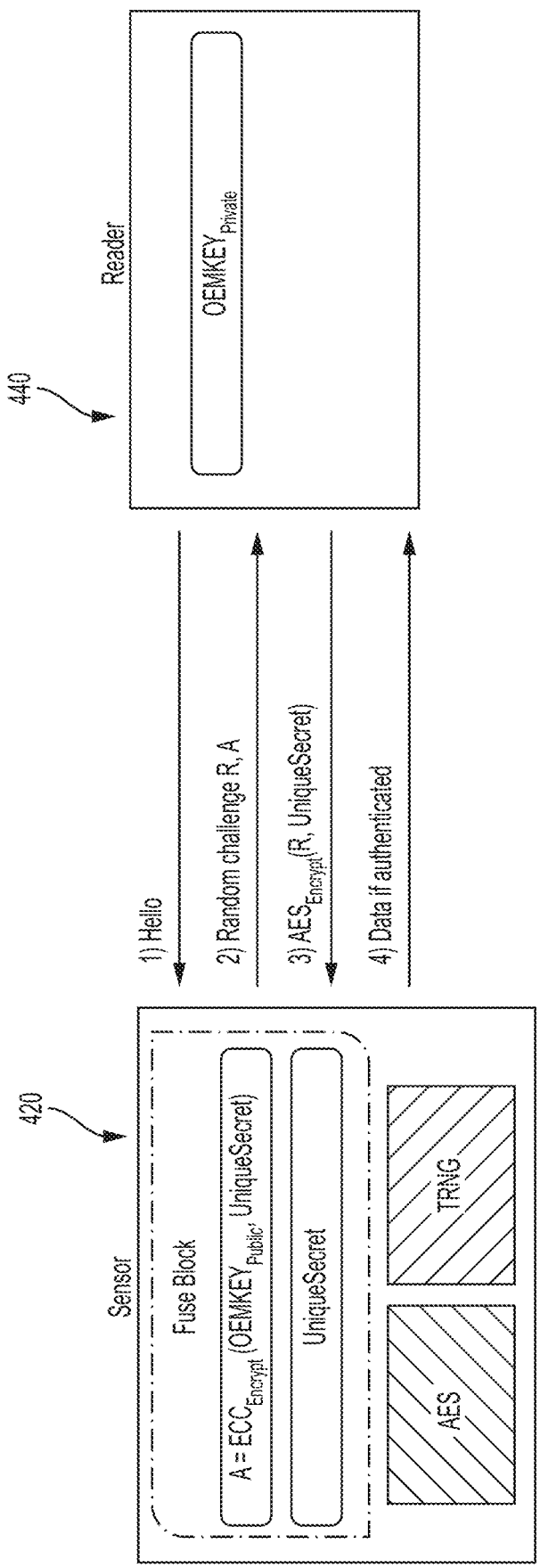
FIG. 4 shows an another embodiment of a reader authentication protocol which may be implemented in a system having a secure passive sensor, according to a non-limiting embodiment of the present application.

FIG. 4 shows an another embodiment of a reader authentication protocol which may be implemented in a system having a secure passive sensor 420, according to a non-limiting embodiment of the present application. FIG. 4 illustrates the secure passive sensor 420 passing messages with the reader 440. The secure passive sensor 420 may be operable to perform asymmetric encryption and authenticate the reader 440 in order to securely communicate.

FIG. 4 shows one implementation of the protocol described in FIG. 3. The Public Key value may be an OEMKEYpublic, and the Private Key value may be the corresponding OEMKEYprivate. The asymmetric encryption scheme may be elliptic curve cryptography (ECC) and the symmetric encryption scheme may be advanced encryption scheme (AES).

In step 1, the reader 440 may send a first message to the secure passive sensor 420. The first message may be any suitable 'wake up' message, to establish communication between the reader 440 and the secure passive sensor 420. In step 2, the secure passive sensor 420 may send a second message to the reader 440. The second message may comprise a random challenge R (e.g., a nonce) and the third value, A. The third value, A, may be the result of using ECC encryption of the UniqueSecret value using the OEMKEYpublic. The random challenge R may be any number produced by the TRNG 304. Upon receiving the second message, the reader 440 may ECC decrypt A, using the Private Key, to recover the Unique Secret.

Once the reader 440 has recovered the Unique Secret, it may AES encrypt the random challenge R, using the Unique Secret, and send the result to the secure passive sensor 420 as the third message. The secure passive sensor 420 may, at any point, also AES encrypt the random challenge R, using the Unique Secret. Once the third message is received, the secure passive sensor 420 may confirm that its result from AES encrypting the random challenge R, using the Unique Secret match the third message. Once the secure passive sensor 420 obtains a value from the reader 440 that matches the result of its AES encryption of the random challenge R, using the Unique Secret, it may send data to the reader 440.

In some embodiments, the protocol may further comprise sending data from the secure passive sensor 420 to the reader 440 once the secure passive sensor 420 confirms that its result from encrypting the random challenge R, using the Unique Secret matches the third message. In some embodiments the Public Key and/or Unique Secret may be stored as physical values in fuses in the secure passive sensor 420. It should be recognized that, when the description above discloses encrypting a first value with a second value, some embodiments may encrypt the second value with the first value to similar effect. Similarly, some embodiments may decrypt in a corresponding manner.

Figure 5:
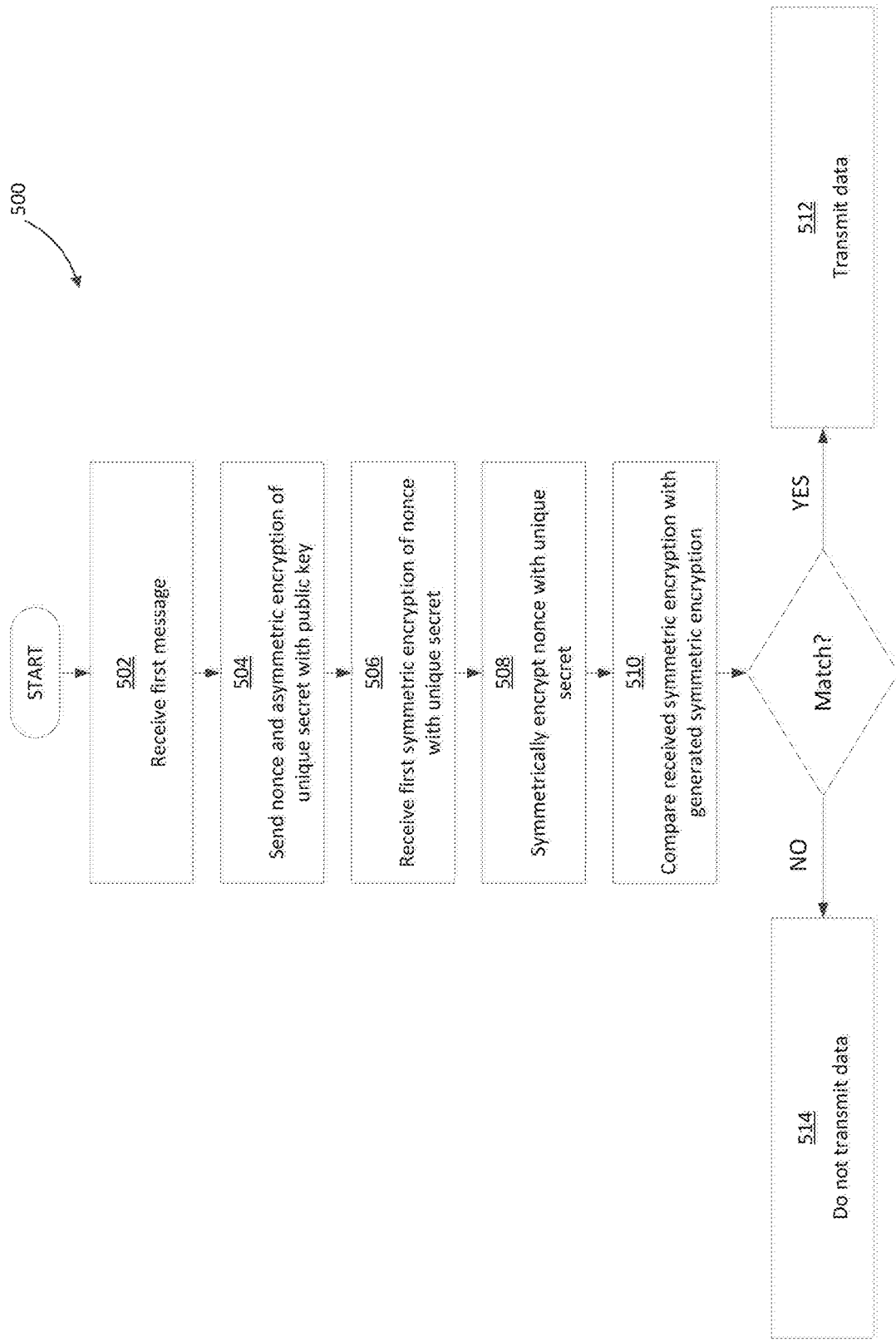
FIG. 5 shows an embodiment of a method of operation for a secure passive sensor.

FIG. 5 shows an embodiment of a method of operation for a secure passive sensor. FIG. 5 illustrates a method 500 of operation for a secure passive sensor. The method 500 may begin in act 502, when the secure passive sensor may receive a first message. The first message may be any suitable 'wake up' message, to establish communication between the secure passive sensor and a reader sending the first message. The secure passive sensor may use the first message, and/or subsequent messages from the reader, as a power source to perform any or all of the acts in the method 500, as explained above. It should be appreciated that in some embodiments, the first message may be multiple messages, suitable for establishing communication between the secure passive sensor and the reader, and for powering the secure passive sensor.

At act 504, the secure passive sensor may generate a nonce using a random number generator, and transmit the nonce along with an asymmetric encryption of a unique secret with a public key of the secure passive sensor. The nonce may be a pseudo or truly randomly generated number. The unique secret may be a number or string unique to the secure passive sensor and may be stored on the secure passive sensor in memory, on fuses, or any other suitable storage system. The asymmetric encryption of the unique secret with the public key of the secure passive sensor may be generated in software on the secure passive sensor, or may be precomputed and stored in the secure passive sensor.

In act 506, the secure passive sensor may receive a message corresponding to a symmetric encryption of the nonce with the unique secret. In act 508, the secure passive sensor may perform its own symmetric encryption of the nonce with the unique secret. Both of the nonce and the unique secret may be available to the secure passive sensor in its memory, or on fuses.

The result of the symmetric encryption may then be compared, in act 510, to the received message. If the result of the symmetric encryption matches the received message, then the method may proceed to act 512, otherwise the method may proceed to act 514. Matching the result of the symmetric encryption to the received message proves to the secure passive sensor that the reader has a private key corresponding to the secure passive sensor's public key, as explained above, and therefore is authorized to receive the data stored on the secure passive sensor. Accordingly, in act 512, the secure passive sensor may begin to transmit the data collected by the sensor to the reader. The transmitted data may or may not be encrypted. If the transmitted data is encrypted, it may be encrypted using the secure passive sensor's nonce, public key, or unique secret.

In act 514, when the secure passive sensor is unable to confirm that its symmetric encryption of the nonce with the unique secret matches the received message, it may not transmit the data as it may be unable to confirm that the reader is authorized to access the data.

Figure 6:
FIG. 6 shows an embodiment of a method of operation for a reader.

FIG. 6 shows an embodiment of a method of operation for a reader. FIG. 6 illustrates a method 600 of operation for a reader. The method 600 may begin with act 602. In act 602, the reader may transmit a first message. The first message may be any suitable 'wake up' message, to establish communication between the secure passive sensor and a reader sending the first message. The reader may transmit the first message at a power level suitable for the reader to use the first message as a power source.

In act 604, the reader may receive a second message, comprising a nonce as well as an asymmetric encryption of a unique secret corresponding to the secure passive sensor with a public key corresponding to the secure passive sensor.

In act 606, the reader may recover the nonce from the second message, either directly or by decrypting the nonce using its private key, if the nonce is encrypted. The reader may also recover the unique secret by performing an asymmetric decryption on the second message using its private key. The private key of the reader may be stored on the reader and set before the execution of the method 600. The private key of the reader may correspond to the public key of the secure passive sensor, such that an asymmetric encryption by the secure passive sensor using its public key may be decrypted using the private key of the reader. The mathematical relationship between the two keys may depend on the encryption scheme used.

In act 608, the reader may symmetrically encrypt the recovered nonce and unique secret, and transmit the result to the secure passive sensor.

In act 610, if the secure passive sensor validates the transmission from act 608, the reader may receive transmitted data from the secure passive sensor. The data may comprise information sensed by the secure passive sensor, diagnostic data, status data, and any other suitable information. The transmitted data may or may not be encrypted. If the transmitted data is encrypted, the reader may additionally decrypt the data using its private key, the nonce, or the unique secret, or the reader may leave the data encrypted.

Figure 7:
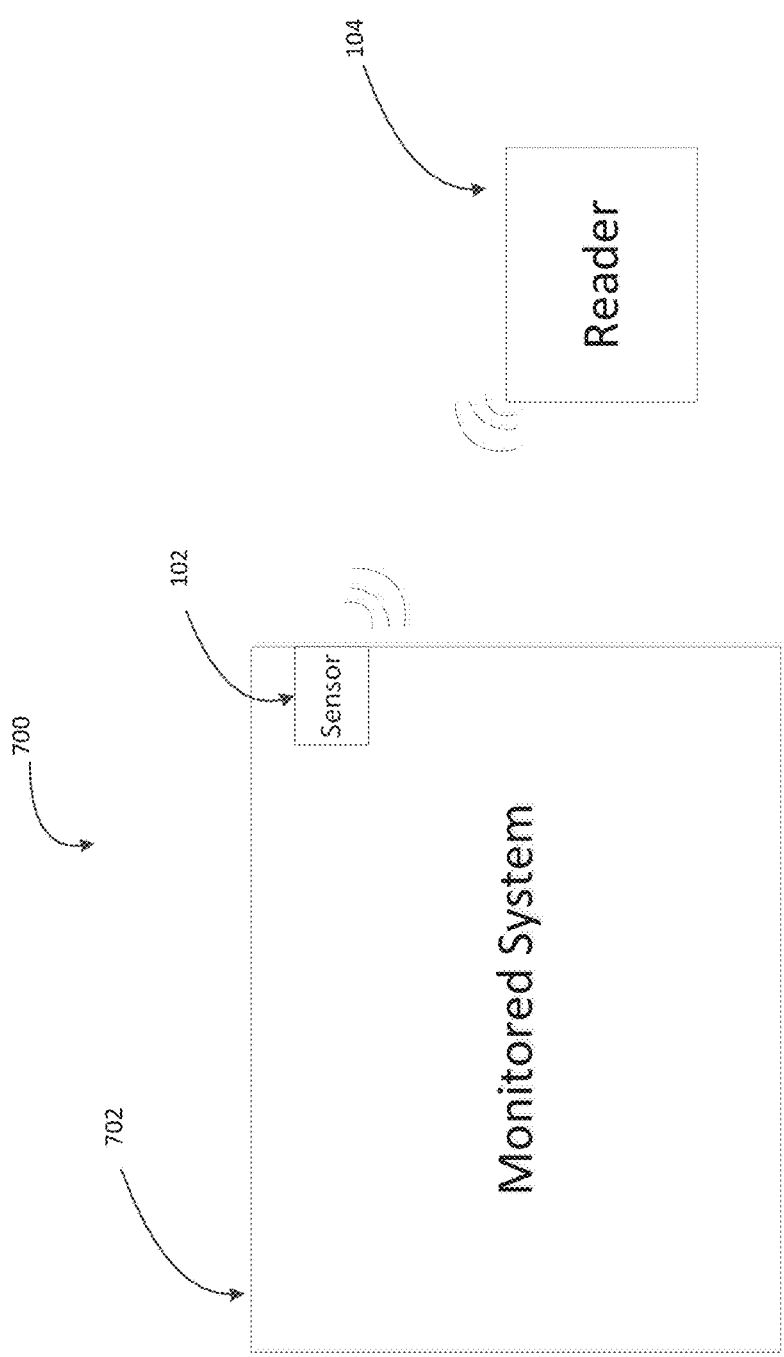
FIG. 7 shows an embodiment of the use of a system including a secure passive sensor and a reader.

FIG. 7 shows an embodiment of the use of a system 700 including a secure passive sensor 102 and a reader 104. FIG. 7 illustrates a monitored system 702 coupled to the secure passive sensor 102 and the reader 104. The system 700 may comprise a monitored system 702, a secure passive sensor 102, and a reader 104. The monitored system 702 may be any system that is monitored by the secure passive sensor 102, such as an industrial process, a manufacturing machine, an engine, a control panel, or an optical system, for example. The secure passive sensor 102 may be arranged in a manner such that it can sense a desired characteristic of the monitored system 702. For example, if a user wants to monitor the vibration of an industrial process, the secure passive sensor 102 may be placed on/coupled to a surface of the monitored system 702. In another example, if a user wants to monitor a voltage of a control panel, the secure passive sensor 102 may be integrated into the monitored system 102. In yet another example, if a user wants to monitor infrared emissions of a system, the secure passive sensor 102 may be placed separately from, but within line of sight of, the monitored system 102. The reader 104 may be brought into proximity of the secure passive sensor 102 to power the secure passive sensor 102, such that the reader 104 may obtain the data on the secure passive sensor 102 regarding the monitored system 102. In some embodiments, the proximity of the reader 104 to the secure passive sensor 102 to begin communication may be within 1 meter, 5 meters, or 10 meters. The secure passive sensor 102 may verify that the reader 104 is authorized to obtain the data stored on the secure passive sensor 102 through the methods described herein. This way, an unauthorized user may not be given access to information about the monitored system 702.

Figure 8:
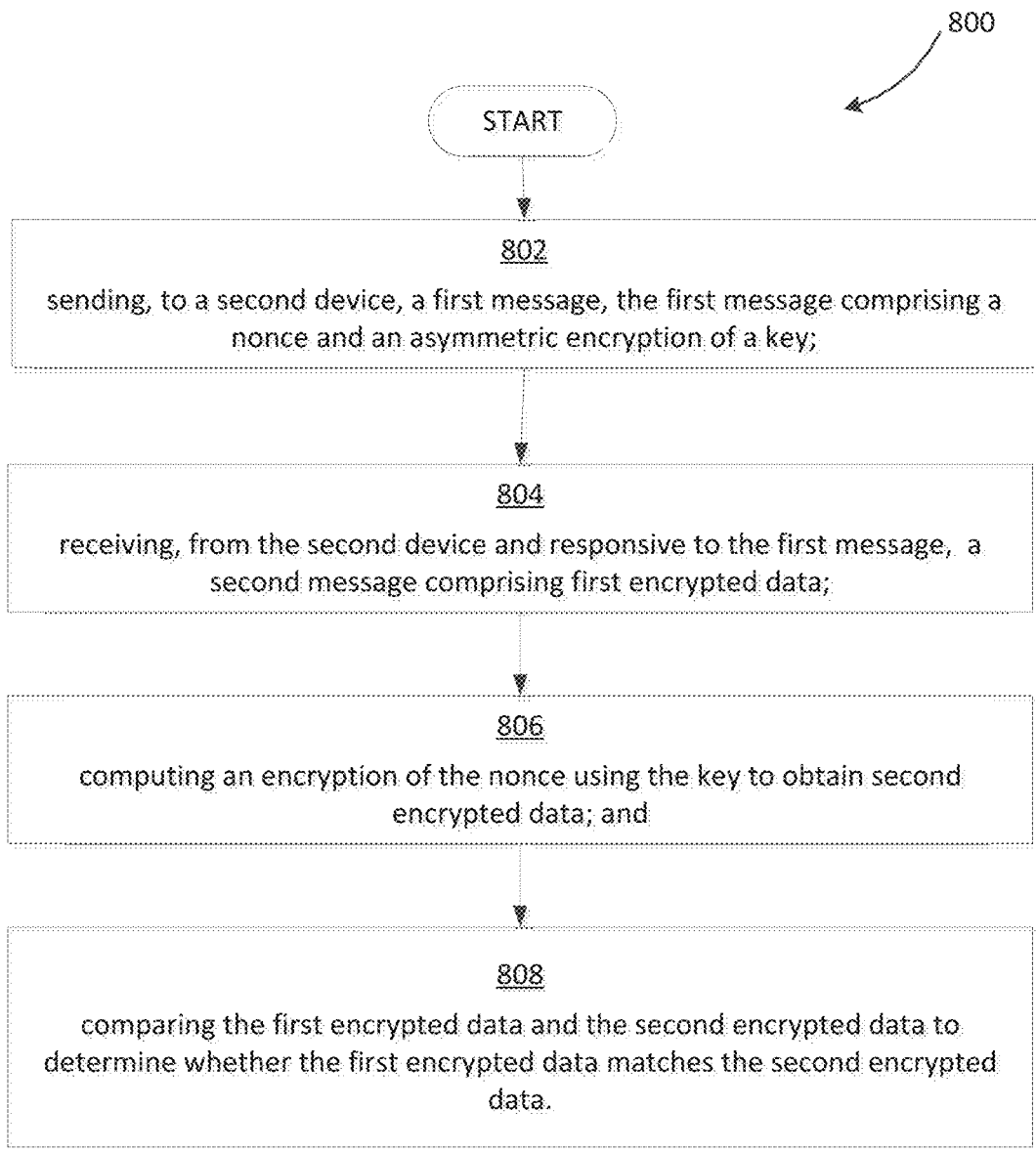
FIG. 8 shows a method for secure communication using a first device, according to a non-limiting embodiment of the present application.

FIG. 8 shows a method 800 for secure communication using a first device. The first device may be a secure passive sensor device as was described with reference to any of the preceding FIGS. The acts of the method may be performed by the passive sensor device.

In some embodiments, prior to act 802, the first device receives an initial message indicating to send the first message. The first device may receive electromagnetic energy transmitted over a wireless medium and use the received electromagnetic energy as a source of power.

At act 802, a first message is sent from the first device to a second device. The first message comprises a nonce and an asymmetric encryption of a key. The nonce may be a random number and/or random challenge. A suitably random nonce may be generated by a random number generator connected to the device. The key may be a unique secret. The asymmetric encryption may be stored in and retrieved from memory on the first device, which may not be configured to perform asymmetric encryption.

At act 804, a second message comprising first encrypted data is received at the first device from the second device. The second message is responsive to the first message. In some embodiments, if the reader is authentic, the first encrypted data should include the nonce encrypted using the key.

At act 806, an encryption of the nonce using the key is computed to obtain second encrypted data. At act 808, the first and second encrypted data are compared to determine whether the first encrypted data matches the second encrypted data. In some embodiments, a third message is sent when the first encrypted data matches the second encrypted data. The third message may include data stored in the first device.

In some examples, the components disclosed herein may read parameters or instructions that affect the functions performed by the components. These parameters or instructions may be physically stored in any form of suitable memory including volatile memory (such as RAM) or nonvolatile memory (such as a magnetic hard drive). In addition, the parameters or instructions may be logically stored in a propriety data structure (such as a database or file defined by a user space application) or in a commonly shared data structure (such as an application registry that is defined by an operating system). In addition, some examples provide for both system and user interfaces that allow external entities to modify the parameters and instructions and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture.

It is to be appreciated that embodiments of the methods and apparatuses described herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features described in connection with any one or more embodiments are not intended to be excluded from a similar role in any other embodiments.

The terms "approximately," "substantially," and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A secure passive sensor node, comprising:
   a memory configured to store first encrypted data comprising a precomputed asymmetric encryption of a secret encrypted using a public key of a reader device, wherein the precomputed asymmetric encryption of the secret is obtained without performance of asymmetric encryption by the secure passive sensor node;

a wireless communication circuit configured to:
generate a first message including a nonce and the first encrypted data without performing asymmetric encryption, the generating comprising reading the first encrypted data comprising the precomputed asymmetric encryption of the secret from the memory;

transmit the first message including the nonce and the first encrypted data to the reader device; and receive, responsive to transmitting the first message, a second message including second encrypted data based on the first message, wherein the second encrypted data was encrypted using the secret; and security circuitry configured to authenticate the reader device based on the second encrypted data.

2. The secure passive sensor node of claim 1, further comprising a sensor configured to obtain data.

3. The secure passive sensor node of claim 2, wherein the wireless communication circuit is further configured to transmit the obtained data when the reader device is authenticated.

4. The secure passive sensor node of claim 1, wherein the asymmetric encryption of the secret comprises an asymmetric encryption of a key.

5. The secure passive sensor of claim 4, wherein the security circuitry is configured to:
generate the second encrypted data by encrypting the nonce using the key.

6. The secure passive sensor of claim 1, further comprising an energy storage circuit.

7. A reader for reading information from a passive device, comprising:
a memory configured to store a private key;
a wireless communication circuit configured to communicate with an external passive device configured to store a precomputed asymmetric encryption of a secret, the precomputed asymmetric encryption of the secret encrypted using a public key of the reader corresponding to the private key;
a processor coupled to the wireless communication circuit and configured to:
receive, using the wireless communication circuit, a first message including a nonce and first encrypted data from the external passive device, the first encrypted data comprising the precomputed asymmetric encryption of the secret encrypted using the public key of the reader corresponding to the private key;
decrypt, using the private key, the first encrypted data to obtain decrypted data comprising the secret; and
generate, responsive to the first message, a second message including second encrypted data based on the decrypted data, the generating comprising encrypting data using the secret to obtain the second encrypted data.

8. The reader of claim 7, wherein the reader comprises an energy beaming circuit configured to power the passive device.

9. The reader of claim 7, wherein the processor is configured to decrypt the first encrypted data by computing an asymmetric decryption of the first encrypted data using the stored private key.

10. The reader of claim 7, wherein the processor is further configured to:
obtain an encryption key from the decrypted data; and
generate the second encrypted data using the obtained encryption key.

11. The reader of claim 7, wherein the processor is configured to include an encryption of the nonce in the second encrypted data.

12. The reader of claim 7, wherein the processor is further configured to transmit, using the wireless communication circuit, the second message to the external passive device.

13. The reader of claim 7, wherein the processor is further configured to encrypt the second encrypted data using a symmetric encryption scheme.

14. The secure passive sensor node of claim 1, wherein the memory comprises a fuse block, the fuse block comprising a set of fuses holding fixed predetermined values.

15. The secure passive sensor node of claim 4, wherein the memory is configured to store the key.

16. The secure passive sensor node of claim 5, wherein encrypting the nonce using the key comprises using a symmetric encryption scheme to encrypt the nonce.

17. The reader of claim 7, wherein the processor is configured to:
send, using the wireless communication circuit, a message to the passive device to establish communication with the passive device; and
receive the first message after establishing communication with the passive device.

18. The reader of claim 12, wherein the processor is configured to receive data from the external passive device after transmitting the second message to the external passive device.

19. A method performed by a passive sensor node configured to store first encrypted data comprising a precomputed asymmetric encryption of a secret encrypted using a public key of a reader device, the precomputed asymmetric encryption of the secret obtained without performance of asymmetric encryption by the secure passive sensor node, the method comprising:
using a processor to perform:
generating a first message including a nonce and the first encrypted data without performing asymmetric encryption, the generating comprising reading the stored first encrypted data comprising the precomputed asymmetric encryption of the secret from memory;
transmitting the first message including the nonce and the first encrypted data to the reader device;
receiving, responsive to transmitting the first message, a second message including second encrypted data based on the first message, wherein the second encrypted data was encrypted using the secret; and
authenticating the reader device based on the second encrypted data.

20. The method of claim 19, wherein the asymmetric encryption of the secret comprises an asymmetric encryption of a key.

* * * * *